US011733903B2

(12) United States Patent
Durgin et al.

(10) Patent No.: US 11,733,903 B2
(45) Date of Patent: Aug. 22, 2023

(54) DATA RELOCATION FOR DATA UNITS IN SCALE-OUT STORAGE SYSTEMS

(71) Applicant: Red Hat, Inc., Raleigh, NC (US)

(72) Inventors: Joshua Durgin, Canyon County, CA (US); Gabriel Zvi BenHanokh, Tel-Aviv (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/341,470

(22) Filed: Jun. 8, 2021

(65) Prior Publication Data
US 2022/0391119 A1    Dec. 8, 2022

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0631* (2013.01); *G06F 3/0652* (2013.01)

(58) Field of Classification Search
CPC .... G06F 3/0647; G06F 3/0604; G06F 3/0631; G06F 3/0652; G06F 3/067
See application file for complete search history.

(56) References Cited

U.S. PATENT DOCUMENTS

| | | | |
|---|---|---|---|
| 9,372,865 B2 | 6/2016 | Venkatesh et al. | |
| 9,898,478 B2 | 2/2018 | Vijayan et al. | |
| 10,255,287 B2 | 4/2019 | Sarab et al. | |
| 10,430,384 B1 | 10/2019 | Desai | |
| 10,768,843 B2 | 9/2020 | Faibish et al. | |
| 2015/0169415 A1* | 6/2015 | Hildebrand | G06F 11/2089 714/4.5 |
| 2017/0139768 A1* | 5/2017 | Camp | G06F 3/0647 |
| 2017/0277729 A1 | 9/2017 | Dain et al. | |
| 2017/0308464 A1* | 10/2017 | Hwang | G06F 3/064 |
| 2020/0341659 A1* | 10/2020 | Chauhan | G06F 3/067 |
| 2021/0263678 A1* | 8/2021 | Glimcher | G06F 3/061 |
| 2022/0129178 A1* | 4/2022 | Alkalay | G06F 3/0647 |

OTHER PUBLICATIONS

Lin, X., et al., "Metadata Considered Harmful . . . to Deduplication," Hotstorage, 2015, https://www.usenix.org/system/files/conference/hotstorage15/hotstorage15-lin.pdf.

* cited by examiner

*Primary Examiner* — Masud K Khan
(74) *Attorney, Agent, or Firm* — Kilpatrick Townsend & Stockton LLP

(57) ABSTRACT

Data units can be relocated in scale-out storage systems. For example, a computing device can receive, at a first node of a scale-out storage system, a request for a data unit. The first node can include a metadata entry associated with the data unit. The computing device can determine, based on the metadata entry, that a second node of the scale-out storage system includes the data unit. The computing device can determine, from the metadata entry, that a number of versions of the data unit in the scale-out storage system meets or exceeds a threshold. The computing device can output a command to cause the data unit to be relocated to the first node with the metadata entry.

20 Claims, 3 Drawing Sheets

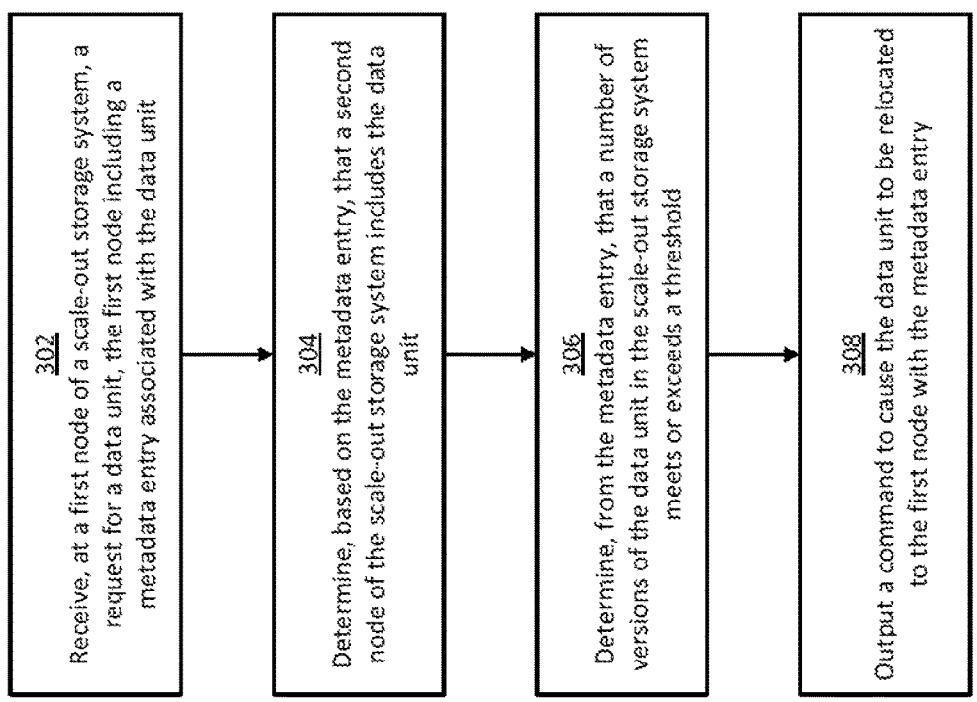

DATA RELOCATION FOR DATA UNITS IN SCALE-OUT STORAGE SYSTEMS

TECHNICAL FIELD

The present disclosure relates generally to data storage systems. More specifically, but not by way of limitation, this disclosure relates to data relocation for data units in scale-out storage systems.

BACKGROUND

Distributed storage systems can include storage nodes (e.g., physical servers) in communication with each other over a network for synchronizing, coordinating, and storing data. The storage nodes can work together so that the distributed storage system behaves as one storage system. Distributed storage systems can implement block storage, file storage, or object storage techniques. There are numerous advantages to using distributed storage systems, such as improved scalability, redundancy, and performance. In particular, distributed storage systems can be implemented as a scale-up storage system that is scaled vertically or a scale-out system that is scaled horizontally. In scale-up storage systems, resources (e.g., CPUs, memory, or storage) are added to a single node until a limit is reached. In scale-out storage systems, nodes are added to the system as necessary. Distributed storage systems are easily scaled horizontally, in the sense that they can combine many storage nodes into a single, shared storage system. Distributed storage systems can also store many copies of the same data for high availability, backup, and disaster recovery purposes.

The many copies of the same data may be deduplicated to reduce storage requirements of the distributed storage system. Deduplication can involve storing an instance of a data unit and having other instances of the data unit point to that instance. To determine whether an instance of a data unit already exists in a system, a hash of the data unit can be calculated and compared to a list of hash values for data unit that exist in the system. If the hash is in the list, it can be determined that the data unit already exists in the system, so only a reference pointing to the data unit can be stored, instead of storing the data unit itself again. Deduplication reduces storage requirements when the same data unit is requested to be stored multiple times in the system.

BRIEF DESCRIPTION OF THE DRAWINGS

FIG. 3 is a flow chart of a process for data relocation for data units according to some aspects of the present disclosure.

DETAILED DESCRIPTION

Figure 1:
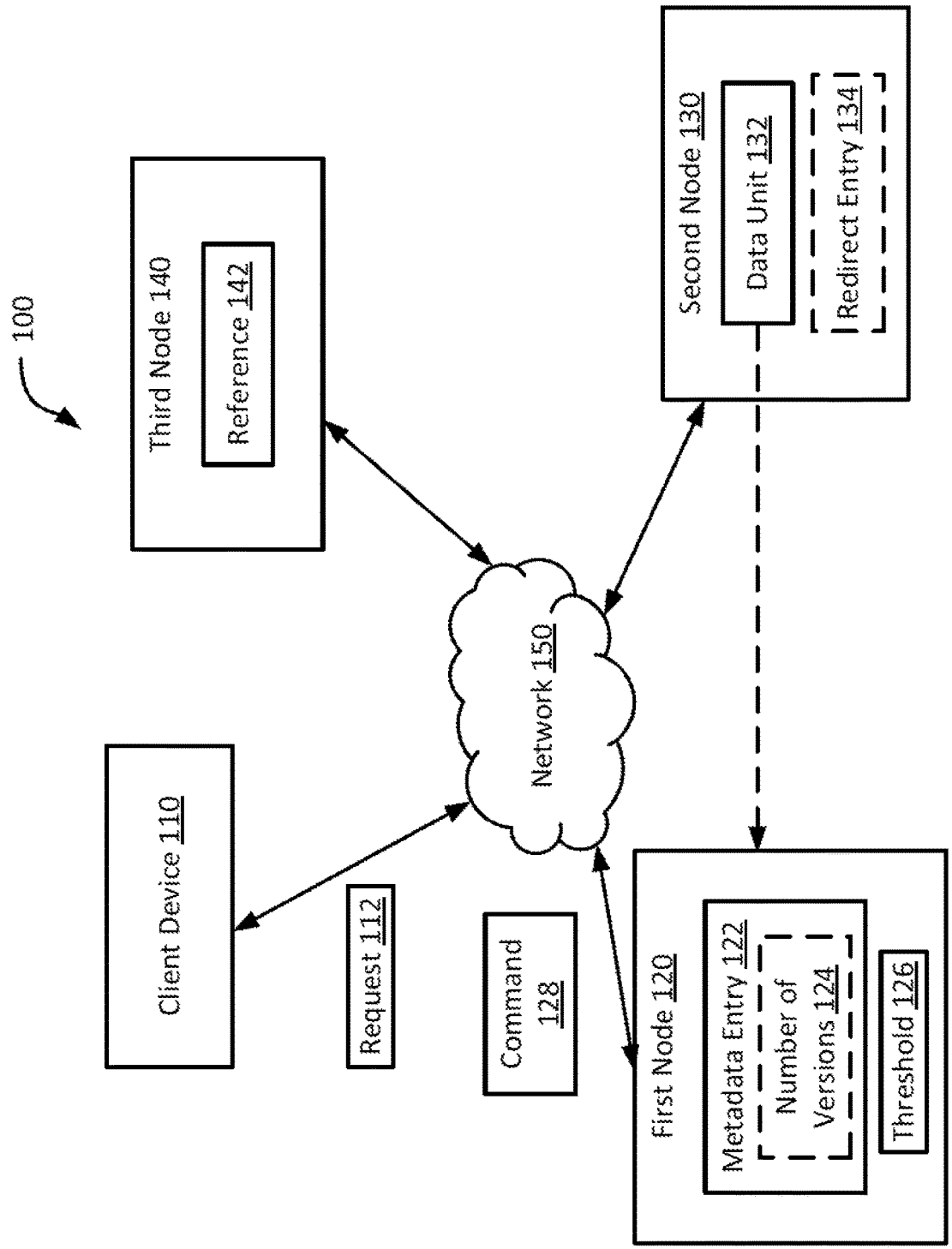
FIG. 1 is a block diagram of an example of a scale-out storage system for implementing data relocation for data units according to some aspects of the present disclosure.

In distributed storage systems, metadata entries are distributed across nodes based on the hashes of the data units they maintain, and data units are randomly distributed across nodes as they are accessed. Thus, data units and their respective metadata entries may be stored on different nodes. This can cause inefficiencies in the system, as operations typically require interaction with the node that includes the data unit as well as the node that includes the metadata entry for the data unit. Additionally, each duplication of the data unit often stores the location of the base copy of the data unit and the location of the metadata entry, which can effectively double the footprint of a duplicated entry. As a result, the system can involve increased overhead in terms of storage capacity and performance.

Some examples of the present disclosure can overcome one or more of the abovementioned problems by providing a system that can receive, at a first node, a request for a data unit. The first node including a metadata entry associated with the data unit. The request can be to search the first node for the metadata entry. The system can determine, based on the metadata entry, that a second node of the system includes the data unit. The system can determine, from the metadata entry, that a number of versions of the data unit in the scale-out storage system meets or exceeds a threshold. The number of versions meeting or exceeding the threshold can indicate that the data unit can be deduplicated in the system to reduce storage requirements. The system can output a command to cause the data unit to be relocated to the first node with the metadata entry. Relocating the data unit can increase efficiency and performance of the system, since the system may only interact with one node for operations involving the data unit.

One particular example can involve node A of a scale-out storage system receiving a request for data unit A. Node A includes a metadata entry for data unit A. Node A can determine, based on the metadata entry, that node B of the scale-out storage system includes data unit A. Node A can also determine, from the metadata entry, that a number of versions of data unit A in the scale-out storage system meets a threshold of two. Then, node A can output a command to cause data unit A to be relocated to node A with the metadata entry. Thus, operations involving data unit A can be more efficient compared to when data unit A and the metadata entry were stored on separate nodes.

A scale-out storage system can refer to a system architecture in which storage space can be added as needed. For example, when a scale-out storage system reaches its current storage limit, another storage device can be added to increase storage capacity. Thus, a scale-out storage system is not limited to certain capacity or performance constraints. A scale-out storage system may include multiple nodes that are connected through a network. Data within a scale-out storage system can be managed through a distributed file system that allows access to multiple hosts through the network.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a scale-out storage system 100 for implementing data relocation for data units according to some aspects of the present disclosure. The scale-out storage system 100 can include a client device 110, a first node 120, a second node 130, and a third node 140. Examples of the client device 110 can include a desktop computer, a laptop, a mobile phone, server, etc. Each of the first node 120, the second node 130, and the third node 140 may be a storage node. The client device 110, the first node 120, the second node 130, and the third node 140 can communicate over a network 150, such as a local area network (LAN) or the Internet.

In some examples, the first node 120 can receive a request 112 for a data unit 132. The request 112 can include a hash associated with the data unit 132 and can be a request to search metadata entries stored on the first node 120 for the hash. The request 112 may be transmitted to the first node 120 in response to a node, such as the third node 140, receiving a write request for the data unit 132 from the client device 110. The first node 120 can receive the request 112 because the first node 120 includes a metadata entry 122 associated with the data unit 132. Data units can be randomly distributed across the first node 120, the second node 130, and the third node 140. But, metadata entries for data units in the scale-out storage system 100 can be distributed among the first node 120, the second node 130, and the third node 140 based on the hashes of the metadata entries. For example, data units associated with a first range of hashes can have metadata entries on the first node 120, data units associated with a second range of hashes can have metadata entries on the second node 130, and data units associated with a third range of hashes can have metadata entries on the third node 140. The hash associated with the data unit 132 can correspond to a hash within the range of hashes for metadata entries on the first node 120. Therefore, the request 112 can be received by the first node 120, since the first node 120 is to include the metadata entry 122 with the hash for the data unit 132.

The metadata entry 122 can include the hash associated with the data unit 132, a number of versions 124 of the data unit 132 in the scale-out storage system 100, information about a location of a master copy of the data unit 132 in the scale-out storage system 100, and other information about the data unit 132. The first node 120 can determine, based on the metadata entry 122, that the second node 130 includes the data unit 132. The first node 120 can also determine, from the metadata entry 122, that the number of versions 124 of the data unit 132 in the scale-out storage system 100 meets or exceeds a threshold 126. The threshold 126 can be two, such that if the threshold 126 is met it can be understood that the data unit 132 is duplicated in the scale-out storage system 100. The first node 120 can determine the number of versions 124 of the data unit 132 is two based on the data unit 132 being stored on the second node 130 and the data unit 132 being stored on the third node 140 in response to the write request.

In some examples, the first node 120 can then output a command 128 to cause the data unit 132 to be relocated to the first node 120 with the metadata entry 122. Waiting to relocate the data unit 132 until the number of versions 124 meets or exceeds the threshold 126 can prevent the scale-out storage system 100 from using resources for relocation for data units with few references. However, the data unit 132 can be relocated even if only one version of the data unit 132 exists in the scale-out storage system 100. Relocating the data unit 132 can allow the data unit 132 to be stored on the same node as the metadata entry 122 for the data unit 132. As a result, operations involving the data unit 132 can involve less processing, since only one node of the scale-out storage system 100 can be interacted with instead of multiple when the data unit 132 and the metadata entry 122 are stored on separate nodes.

Relocating the data unit 132 can involve the first node 120 allocating space on the first node 120 for the data unit 132. For example, the first node 120 can determine a size of the data unit 132, such as 60 bytes, and allocate a space the size of the data unit 132 in the first node 120 for storing the data unit 132. The first node 120 can then transmit the command 128 to the second node 130 indicating the data unit 132 is to be transmitted to the first node 120. In response to receiving the command 128, the second node 130 can transmit the data unit 132 to the first node 120. Once the first node receives the data unit 132 and stores it, the second node 130 can remove the data unit 132 from the second node 130. The command 128 can include the indication that once the second node 130 transmits the data unit 132 it is to be removed from the second node 130. Alternatively, the first node 120 may send another command indicating the data unit 132 is to be removed subsequent to the first node 120 storing the data unit 132.

If the third node 140 also includes a copy of the data unit 132, the first node 120 can also transmit the command 128 for removing the data unit 132 from the third node 140. The command for transmitting the data unit 132 may only be transmitted to one of the nodes that includes the data unit 132, so the third node 140 may not receive the command 128 that indicates the data unit 132 is to be transmitted to the first node 120.

In some examples, rather than including a copy of the data unit 132, the third node 140 may include a reference 142 to the data unit 132 on the second node 130. In these examples, the first node 120 can transmit the command 128 to the third node 140 and the command 128 can include a notification that the data unit 132 is stored in the first node 120. The third node 140 can then update the reference 142 to indicate that the data unit 132 is on the first node 120 instead of the second node 130. The command 128 with the notification can be transmitted to each node of the scale-out storage system 100 that includes a reference to the data unit 132, and each of the nodes can update the reference based on the notification.

In some examples, the command 128 transmitted to the second node 130 can indicate that the data unit 132 is to be replaced with a redirect entry 134. This may be done instead of transmitting the command 128 to the third node 140 with the notification. The redirect entry 134 can be used to update the reference 142 about the data unit 132 at the third node 140. For example, the third node 140 can receive another write request for the data unit 132, attempt to locate the data unit 132 in the second node 130 based on the reference 142, find the redirect entry 134 indicating the data unit 132 is on the first node 120, and then update the reference 142 based on the redirect entry 134. The metadata entry 122 may additionally include a counter that indicates a number of nodes that include a reference to the previous location of the data unit 132. Once a node updates its reference using the redirect entry 134, the counter can be decremented by one. When the counter reaches zero, the first node 120 can transmit a notification to the second node 130 indicating that the redirect entry 134 can be removed.

In some examples, the metadata entry 122 may additionally include a timestamp indicating when the metadata entry 122 was last modified. If the number of versions 124 in the metadata entry 122 does not meet or exceed the threshold 126 within a predefined length of time, the metadata entry 122 can be removed. Removing metadata entries that are not duplicated after the predefined length of time can free up space on the first node 120 for other metadata entries.

FIG. 1 is illustrative and non-limiting. Other examples may include more components, fewer components, different components, or a different arrangement of the components shown in FIG. 1. For example, although the scale-out storage system 100 includes three nodes and one data unit in the example of FIG. 1, the scale-out storage system 100 may include a larger number of nodes and data units in other examples.

Figure 2:
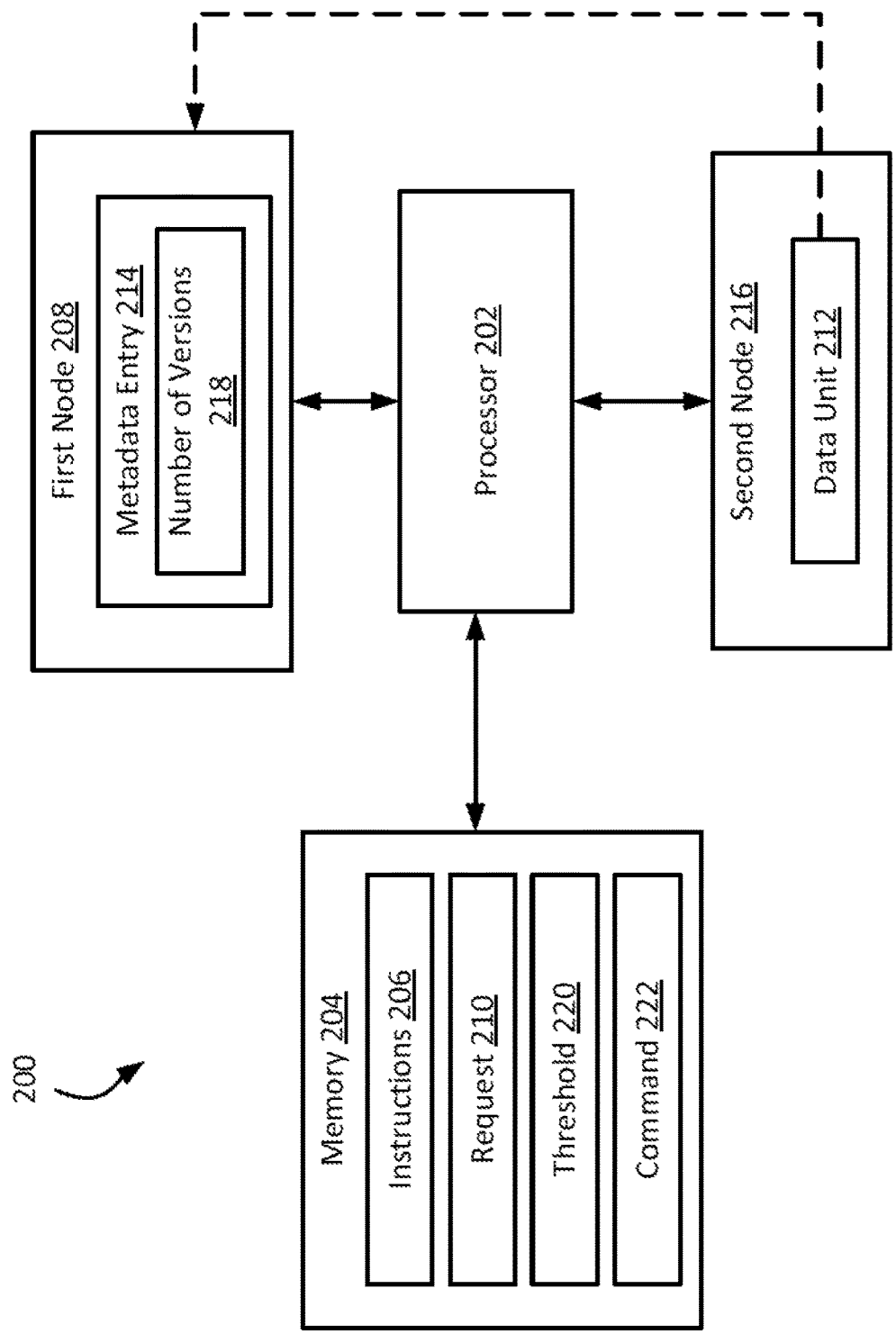
FIG. 2 is a block diagram of another example of a scale-out storage system for implementing data relocation for data units according to some aspects of the present disclosure.

FIG. 2 is a block diagram of another example of a scale-out storage system 200 for implementing data relocation for data units according to some aspects of the present disclosure. The scale-out storage system 200 includes a processor 202. The processor 202 may be part of a node, such as the first node 120 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can receive, at a first node 208 of the scale-out storage system 200, a request 210 for a data unit 212, the first node 208 including a metadata entry 214 associated with the data unit 212. The processor 202 can determine, based on the metadata entry 214, that a second node 216 of the scale-out storage system 200 includes the data unit 212. The processor 202 can also determine, from the metadata entry 214, that a number of versions 218 of the data unit 212 in the scale-out storage system 200 meets or exceeds a threshold 220. The processor 202 can output a command 222 to cause the data unit 212 to be relocated to the first node 208 with the metadata entry 214. The processor 202 may allocate space on the first node 208 for the data unit 212 and notify the second node 216 that the data unit 212 is to be replaced with a redirect entry.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can receive, at a first node 208 of a scale-out storage system 200, a request 210 for a data unit 212. The request 210 can be to search for metadata entry that corresponds to the data unit 212. The first node 208 can include a metadata entry 214 associated with the data unit 212. The metadata entry 214 can include a hash of the data unit 212, a number of versions 218 of the data unit 212 in the scale-out storage system 200, and an indication of a location of a master copy of the data unit 212 in the scale-out storage system 200.

In block 304, the processor 202 can determine, based on the metadata entry 214, that a second node 216 of the scale-out storage system 200 includes the data unit 212. The data unit 212 can be randomly stored on the data unit 212 subsequent to a first write request for the data unit 212 in the scale-out storage system 200.

In block 306, the processor 202 can determine, from the metadata entry 214, that the number of versions 218 of the data unit 212 in the scale-out storage system 200 meets or exceeds a threshold 220. The threshold 220 may be two, such that the threshold 220 is met when two copies of the data unit 212 exist in the scale-out storage system 200.

In block 308, the processor 202 can output a command 222 to cause the data unit 212 to be relocated to the first node 208 with the metadata entry 214. The second node 216 can receive the command 222, transmit the data unit 212 to the first node 208, and replace the data unit 212 with a redirect entry to update other nodes that include a reference to the data unit 212. Alternatively, the command 222 may be sent to each node with a reference to the data unit 212 to notify the nodes that the data unit 212 is stored on the first node 208, so that the references can be updated. Relocating the data unit 212 to the first node 208 with the metadata entry 214 can reduce processing for operations involving the data unit 212, since the scale-out storage system 200 can analyze and process the metadata entry 214 and the data unit 212 at the same node instead of an interaction with multiple nodes.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:
1. A system comprising:
a processor; and
a memory including instructions that are executable by the processor for causing the processor to:
  receive, at a first node of a scale-out storage system, a request for a data unit, the first node including a metadata entry associated with the data unit;
  determine, based on the metadata entry, that a second node of the scale-out storage system includes the data unit;
  determine, from the metadata entry, that a number of copies of the data unit in the scale-out storage system meets or exceeds a threshold, the number of copies of the data unit being stored based on one or more write requests for the data unit; and
  in response to determining that the number of copies meets or exceeds the threshold, output a command to cause the data unit to be relocated to the first node with the metadata entry.

2. The system of claim 1, wherein the memory further includes instructions that are executable by the processor for causing the processor to:
determine, from the metadata entry, the number of copies of the data unit in the scale-out storage system is below the threshold; and
maintain the data unit in the second node.

3. The system of claim 1, wherein the memory further includes instructions that are executable by the processor for causing the processor to relocate the data unit to the first node by:
allocating space on the first node for the data unit;

transmitting the command to the second node indicating the data unit is to be transmitted to the first node;
receiving the data unit at the first node from the second node; and
removing the data unit from the first node.

4. The system of claim 3, wherein the command further indicates the data unit is to be replaced with a redirect entry for updating a reference about the data unit at a third node of the scale-out storage system, the reference indicating a location of the data unit in the scale-out storage system.

5. The system of claim 3, wherein the memory further includes instructions that are executable by the processor for causing the processor to transmit the command including a notification to each node of the scale-out storage system that includes a reference to the data unit, the notification indicating the data unit is stored in the first node.

6. The system of claim 1, wherein the memory further includes instructions that are executable by the processor for causing the processor to determine the second node includes the data unit by:
comparing a hash associated with the data unit to a plurality of metadata entries each including a hash associated with a data unit in the scale-out storage system, the metadata entry being included in the plurality of metadata entries; and
determining the hash associated with the data unit matches the hash included in the metadata entry.

7. The system of claim 1, wherein the memory further includes instructions that are executable by the processor for causing the processor to:
determine, based on the metadata entry, the number of copies of the data unit is below the threshold subsequent to a predefined length of time passing; and
remove the metadata entry for the data unit.

8. A computer-implemented method comprising:
receiving, at a first node of a scale-out storage system, a request for a data unit, the first node including a metadata entry associated with the data unit;
determining, based on the metadata entry, that a second node of the scale-out storage system includes the data unit;
determining, from the metadata entry, that a number of copies of the data unit in the scale-out storage system meets or exceeds a threshold, the number of copies of the data unit being stored based on one or more write requests for the data unit; and
in response to determining that the number of copies meets or exceeds the threshold, outputting a command to cause the data unit to be relocated to the first node with the metadata entry.

9. The method of claim 8, further comprising:
determining, from the metadata entry, the number of copies of the data unit in the scale-out storage system is below the threshold; and
maintaining the data unit in the second node.

10. The method of claim 8, further comprising relocating the data unit to the first node by:
allocating space on the first node for the data unit;
transmitting the command to the second node indicating the data unit is to be transmitted to the first node;
receiving the data unit at the first node from the second node; and
removing the data unit from the first node.

11. The method of claim 10, wherein the command further indicates the data unit is to be replaced with a redirect entry for updating a reference about the data unit at a third node of the scale-out storage system, the reference indicating a location of the data unit in the scale-out storage system.

12. The method of claim 8, further comprising:
transmitting the command including a notification to each node of the scale-out storage system that includes a reference to the data unit, the notification indicating the data unit is stored in the first node.

13. The method of claim 8, further comprising determining the second node includes the data unit by:
comparing a hash associated with the data unit to a plurality of metadata entries each including a hash associated with a data unit in the scale-out storage system, the metadata entry being included in the plurality of metadata entries; and
determining the hash associated with the data unit matches the hash included in the metadata entry.

14. The method of claim 8, further comprising:
determining, based on the metadata entry, the number of copies of the data unit is below the threshold subsequent to a predefined length of time passing; and
removing the metadata entry for the data unit.

15. A non-transitory computer-readable medium comprising program code that is executable by a processor for causing the processor to:
receive, at a first node of a scale-out storage system, a request for a data unit, the first node including a metadata entry associated with the data unit;
determine, based on the metadata entry, that a second node of the scale-out storage system includes the data unit;
determine, from the metadata entry, that a number of copies of the data unit in the scale-out storage system meets or exceeds a threshold, the number of copies of the data unit being stored based on one or more write requests for the data unit; and
in response to determining that the number of copies meets or exceeds the threshold, output a command to cause the data unit to be relocated to the first node with the metadata entry.

16. The non-transitory computer-readable medium of claim 15, further comprising program code that is executable by the processor for causing the processor to:
determine, from the metadata entry, the number of copies of the data unit in the scale-out storage system is below the threshold; and
maintain the data unit in the second node.

17. The non-transitory computer-readable medium of claim 15, further comprising program code that is executable by the processor for causing the processor to relocate the data unit to the first node by:
allocating space on the first node for the data unit;
transmitting the command to the second node indicating the data unit is to be transmitted to the first node;
receiving the data unit at the first node from the second node; and
removing the data unit from the first node.

18. The non-transitory computer-readable medium of claim 17, wherein the command further indicates the data unit is to be replaced with a redirect entry for updating a reference about the data unit at a third node of the scale-out storage system, the reference indicating a location of the data unit in the scale-out storage system.

19. The non-transitory computer-readable medium of claim 17, further comprising program code that is executable by the processor for causing the processor to transmit the command including a notification to each node of the scale-out storage system that includes a reference to the data unit, the notification indicating the data unit is stored in the first node.

20. The non-transitory computer-readable medium of claim 15, further comprising program code that is executable by the processor for causing the processor to:
   determine, based on the metadata entry, the number of copies of the data unit is below the threshold subsequent to a predefined length of time passing; and
   remove the metadata entry for the data unit.

\* \* \* \* \*